United States Patent [19]

Cain et al.

[11] Patent Number: 5,302,408
[45] Date of Patent: Apr. 12, 1994

[54] EDIBLE PLASTIFIED DISPERSION

[75] Inventors: Frederick W. Cain, Voorburg, Netherlands; Malcolm G. Jones, Stevington; Ian D. Bowler, Kempston, both of Great Britain

[73] Assignee: Van Den Bergh Foods Co., Division of Conopco Inc., Lisle, Ill.

[21] Appl. No.: 13,121

[22] Filed: Feb. 3, 1993

Related U.S. Application Data

[63] Continuation of Ser. No. 663,769, Mar. 1, 1991, abandoned, which is a continuation of Ser. No. 324,963, Mar. 16, 1989, abandoned, which is a continuation of Ser. No. 157,208, Feb. 17, 1988, abandoned.

[30] Foreign Application Priority Data

Feb. 18, 1987 [GB] United Kingdom ............... 8703761

[51] Int. Cl.$^5$ .............................................. A23D 7/04
[52] U.S. Cl. ..................................... 426/603; 426/804
[58] Field of Search ............... 426/573, 603, 602, 604, 426/804

[56] References Cited

U.S. PATENT DOCUMENTS

| | | |
|---|---|---|
| 4,103,037 | 7/1978 | Bodor et al. . |
| 4,305,970 | 12/1981 | Moran et al. . |
| 4,389,426 | 6/1983 | Reissmann et al. ................. 426/603 |
| 4,536,408 | 8/1985 | Morehouse et al. . |
| 4,917,915 | 4/1990 | Cain et al. ............................ 426/573 |

FOREIGN PATENT DOCUMENTS

| | | |
|---|---|---|
| 1127000 | 7/1982 | Canada . |
| 0011344 | 5/1980 | European Pat. Off. . |
| 0098664 | 1/1984 | European Pat. Off. . |
| 2035360 | 6/1980 | United Kingdom . |

*Primary Examiner*—Carolyn Paden
*Attorney, Agent, or Firm*—Gerard J. McGowan, Jr.

[57] ABSTRACT

The present invention is concerned with an edible, plastified dispersion containing less than 35 wt. % fat, which comprises from 10 to 35 wt. % continuous fat phase and from 90 to 65 wt. % dispersed aqueous phase, said dispersed aqueous phase having an average droplet size, indicated by the number weighted mean diameter, of less than 5μm, which dispersion comprises less than 0.1 wt. % amino acid residues.

12 Claims, No Drawings

EDIBLE PLASTIFIED DISPERSION

This application is a continuation of U.S. Ser. No. 07/663,769, filed Mar. 1, 1991, now abandoned, which is a continuation of U.S. Ser. No. 07/324,963, filed Mar. 16, 1989, now abandoned, which is a continuation of U.S. Ser. No. 07/157,208, filed Feb. 17, 1988, now abandoned.

BACKGROUND OF THE INVENTION

The present application is concerned with an edible, plastified dispersion containing less than 35 wt. % fat, which comprises from 10 to 35 wt. % continuous fat phase and from 90 to 65 wt. % dispersed aqueous phase.

Edible, plastified water-in-oil dispersions (often called spreads) that can be used as replacement for butter or margarine, having a fat content below 80 wt. %, are well known. A wide variety of such products is commercially available. Most of these products have a fat content of about 40 wt. %.

There is, however, need of spreads comprising a continuous fat phase and a dispersed aqueous phase having a fat content of substantially less than 40 wt. %.

A spread should have a plastified continuous fat phase to give it suitable spreadability and to prevent microbiological deterioration. It should not release moisture when it is being spread. Furthermore, a spread should be spreadable at refrigerator temperature, be stable at room temperature, but destabilize and release its flavour in the mouth. These goals are very difficult to achieve if only a small amount of fat is to be used to constitute the continuous phase.

In GB 2,035,360 a process is disclosed for the preparation of spreads containing 20 wt. % fat. According to this process, the aqueous phase is sprayed onto the fatty phase. During the addition of the sprayed aqueous phase, the emulsion is circulated through a static mixer to increase the viscosity. The final viscosity suitably is about 18000 mpa.s at a shear rate of 13 sec.$^{-1}$ and 2700 mpa.s at a shear rate of 134 sec.$^{-1}$ at 38° C. When this viscosity has been obtained, the emulsion is cooled and worked to cause crystallization of fat to occur.

In practice, this process has not been successful. It is difficult to apply the process under factory conditions.

EP 0 011 344 teaches to incorporate in fat-continuous spreads containing 18-82 wt. % fat phase, a gelled aqueous phase having a softening point of at least 33° C., showing a sharp decrease in gel strength at a temperature ranging from 45° to 70° C. and a gel strength at a temperature below the softening point ranging from 0.1 to 30 N/cm$^2$. Spreads having very low fat contents, prepared with aqueous phase compositions as disclosed in EP 0 011 344 have been found to be unsatisfactory. In particular, such spreads tend to release water under spreading conditions.

U.S. Pat. No. 4,536,408 describes low-fat spreads comprising 15-35 wt. % fat and 15-35 wt. % of a non-gelling starch hydrolysate having a DE (dextrose equivalent) of 4-25. The products are prepared by cooling and mixing the fat into an aqueous solution of the starch hydrolysate with a high-speed blender until phase inversion occurs. The products disclosed in U.S. Pat. No. 4,536,408 have been found to have a poor oral response. They do not break down sufficiently in the mouth and, consequently, they have a poor flavour release.

The process employed to produce the spreads according to U.S. Pat. No. 4,536,408 involves phase inversion of an oil-in-water emulsion containing a fat blend having a melting point above about 38° C., with a high-speed blender. Substantial problems would be encountered if one would try to carry out such a process, requiring the application of very high shear forces, on a factory scale.

Another disadvantage of the proposal of U.S. Pat. No. 4,536,408 is that it contains a very substantial amount of carbohydrate. Although the fat content of the product is low, the reduction in caloric value by reducing the fat content is partially offset by incorporating the starch hydrolysate.

SUMMARY OF THE INVENTION

It has now been found that low calorie spreads that are stable at ambient temperature and under spreading conditions and that have favourable organoleptic properties can be prepared in an essentially conventional manner without having to use specially adapted sophisticated equipment, provided no substantial amount of amino acid residues is present and the aqueous phase droplets are fairly small.

Accordingly, the present invention provides an edible, plastified dispersion containing less than 35 wt. % fat, which comprises from 10 to 35 wt. % continuous fat phase and from 90 to 65 wt. % dispersed aqueous phase, said dispersed aqueous phase having an average droplet size, indicated by the number weighted mean diameter, of less than 5 μm, which dispersion comprises less than 0.1 wt. % amino acid residues.

As is common practice with respect to edible plastified dispersions, the "continuous fat phase" includes the liquid oil forming a continuous phase as well as the solid fat particles contained therein, which have been phase-separated from the liquid oil by the plastification treatment.

The present dispersion can be prepared using conventional equipment without having to use high levels of emulsifier or high melting fat blends.

For example, the dispersion can suitably be prepared with conventional apparatus using e.g. A-units and/or C-units, which may or may not have been provided with a cooling jacket.

Surprisingly it was found that, despite the relatively small diameter of the aqueous phase droplets as present in the dispersions according to the invention, the organoleptic properties of said dispersions, in particular the emulsion breakdown in the mouth, can be very favourable, especially in case only very limited amounts of thickening and/or gelling agents are present in the aqueous phase.

The number weighted mean diameter, whenever referred to in this document with regard to the dispersions according to the present invention, is determined by means of NMR [see J. Colloid and Interface Science (1972), 10, 206 and (1983), 93, 521] using a log-normal distribution as is commonly employed for particle size analysis.

The number weighted mean diameter of the aqueous phase droplets is preferably between 0.1 and 4.8 μm, more preferably between 0.5 and 4.5 μm. Moreover, preferably at least 20 wt. % of the aqueous phase droplets present in the dispersions according to the invention have a diameter of less than 4 μm.

Throughout this application the term amino acid residues is meant to encompass the group of compounds consisting of: intact as well as denatured proteins, di- and oligopeptides and amino acids. It was found that both proteins and oligopeptides, when present in amounts exceeding 0.01 wt. %, adversely affect the product stability.

The aqueous phase of the present products, apart from water, may comprise, for instance, flavour compounds, colouring agents, emulsifiers, as well as small amounts of thickening agents and/or gelling agents. It was observed that dispersions having a relatively large average aqueous phase droplet size are insufficiently stable are insufficiently stable at ambient temperature, in case said products comprise an aqueous phase of which the rheological properties are predominantly determined by the water (i.e. not by the components present therein). In particular, such dispersions appear to release moisture upon spreading.

In order to, at least partially, overcome the above deficiencies, relatively large water droplets, as present in most low-calorie spreads, are normally stabilized by means of the incorporation of substantial amounts of gelling and/or thickening agents in the aqueous phase. The addition of such agents, however, has the disadvantage that they give a rather thick mouthfeel.

The products according to the invention offer the advantage that the water droplets need not be stabilized by the incorporation of substantial amounts of thickening and/or gelling agents. In fact, the incorporation of such substantial amounts of thickening and/or gelling agents is even undesirable, as the presence of substantial amounts of thickening and/or gelling agents in the aqueous phase makes it difficult, if not impossible, to obtain the desired small average droplet size. Moreover, as many gelling and thickening agents comprise considerable amounts of amino acid residues, the incorporation of substantial amounts of such agents will adversely affect the product properties, owing to the presence of amino acid residues, as will be explained below. Thus the dispersions according to the present invention comprise less than 0.2 wt. % gelling and/or thickening agent.

DETAILED DESCRIPTION OF THE INVENTION

Examples of thickening and gelling agents which may be used, at a very reduced concentration level, in the present dispersions are: sodium caseinate, whey protein, gelatin, alginate, agarr carrageenant guar gum, locust bean gum, xanthan, starch derivatives (including hydrolysed starch) and cellulose. As sodium caseinate, whey protein and gelatin almost completely consist of protein, said components can only be used at very low concentration levels in the present dispersions. As alginate, agar and carrageenan comprise relatively small amounts of protein, said components are best suited for incorporation in the dispersions according to the invention.

It was found furthermore that, if the average water droplet size in the products according to the present invention is relatively high, the emulsifier content preferably should not be very high, as the oral breakdown characteristics in that case are adversely affected by the presence of a large amount of emulsifier. If, however, the droplet size is relatively small, larger amounts of emulsifier can be tolerated.

In practice, good products are obtainable if the emulsifier content is less than 2 wt. %, and the product of the emulsifier content in wt. % and the number weighted mean diameter of the aqueous phase droplets in $\mu$m, is less than 2.5. It is believed that the presence of higher amounts of emulsifier inhibits the formation of a water-continuous phase, and consequently reduces the flavour release at mouth temperature, owing to the fact that such emulsifiers favour the formation of a dispersion comprising a water phase dispersed in a continuous oil phase.

The present invention aims at providing an edible spread with a very low caloric value. To this end, it is preferred for the aqueous phase to consist mainly of water. The composition constituting the aqueous phase preferably contains 80-100 wt. % water, more preferably 90-99.9 wt. % water; a water content of 95-99.5 wt. % is particularly preferred.

Although the aqueous phase may include some thickening or gelling agent, it is preferred for such ingredients not to be present. Preferably, the composition constituting the aqueous phase consists of water, preservative, e.g. food acid and/or potassium sorbate, and taste and flavour compounds, for example, food acid, e.g. citric acid or lactic acid, salt and flavour cocktails as employed for making e.g. margarines or low calorie spreads. The dispersion will usually also contain emulsifiers but these are ascribed to the fat phase rather than to the aqueous phase.

As, in the products according to the invention, the presence of a viscous aqueous phase, especially in combination with a relatively small droplet size, may result in a rather thick mouthfeel, it is preferred to use an aqueous phase having a relatively low viscosity, preferably an aqueous phase having a viscosity of less than 5 cps, at a temperature of 35° C. and a shear rate of 1000 s$^{-1}$. The viscosity of the aqueous phase may be determined just before said phase is admixed with the fat phase.

The amino acid residue content of the dispersion is of vital importance. Even amino acid residue contents as low as 0.1 or 0.2 wt. % may make it much more difficult or even impossible to prepare an acceptable product. Conventional starch and starch hydrolysis products and other materials used as, for example, thickening agent in the aqueous phase of spreads and prepared from natural starting materials usually contain some amino acid residue. Thus, inclusion of such ingredients in spreads often causes a certain amount of amino acid residue to be included as well. These amounts already have a substantial adverse effect on the ease of preparation and may affect the quality of the resulting product. It is therefore preferred not to include such ingredients in the present dispersion.

Preferably, the amino acid residue content of the dispersion is less than 0.01 wt. %, more preferably even less than 0.001 wt. %. The amount of amino acid residue that can be tolerated depends, inter alia, on the available processing facilities, the processing being more critical and demanding as the amino acid residue content increases. Complete absence of amino acid residue may, however, not always be obtainable since it may not always be possible to free other ingredients to be included completely from protein and other amino acid residues. Moreover, a minute amount of protein, e.g. of about 0.0001 wt. % of the total product, may have a favourable effect on the organoleptic properties of the product.

The dispersion preferably comprises only 15 to 28 wt. % continuous fat phase, the balance consisting of dispersed aqueous phase.

The amount of emulsifier that can be used without adversely affecting the organoleptic properties of the dispersion depends on the type of emulsifier employed. In practice, it is preferred that the dispersion should contain less than 1.0 wt. % emulsifier. More preferably, the emulsifier content of the product is 0.05 to 1.0 wt. %, 0.1 to 0.5 wt. % being particularly preferred.

Both for ease of preparation and in view of the influence on the organoleptic properties of the resulting dispersion, it is preferred to employ an emulsifier composition having a relatively low melting point. In case monoglycerides are employed as emulsifiers, it is preferred to incorporate a monoglyceride composition having a melting point below 55° C.

Throughout this specification the terms oil and fat are used interchangeably. They are meant to include triglycerides such as soybean oil, sunflower oil, palm oil, fish oil, rapeseed oil, coconut oil, chemically and/or physically modified products such as hydrogenated, fractionated and/or interesterified triglyceride mixtures and mixtures of two or more thereof, as well as edible substances that are physically similar to triglycerides such as waxes, e.g. jojoba oil, and poly fatty acid esters of mono- or disaccharides, and that can be used as replacement for, or in admixture with, triglyceride oil.

Preferably, the fat contained in the present spreads consists essentially of triglycerides.

The precise composition of the fat is not critical. The solid fat content at 20° C. is suitably between 5 and 30 wt. %, preferably between 5 and 20 wt. %. At 5° C. the solid fat content is suitably between 5 and 50 wt. %, preferably between 10 and 25 wt. %.

In view of the breakdown properties in the mouth, however, it is preferred that the dispersion contains less than 6% solid fat at 30° C. calculated on the weight of the fat. More preferably, it contains 0.5-3 wt. % solid fat at 30° C. calculated on the weight of the total fat content of the product. We have found that, especially with a product of this type, the organoleptic characteristics depend fairly strongly on the solid fat content at temperatures just below the temperature in the mouth.

The solid fat content can conveniently be determined by measuring at the relevant temperature, e.g. 30° C., the NMR N-value (e.g. N30) as described in Fette, Seifen/ Anstrichmittel, 80 (1978), 180–186, which indicates the amount of fat present in the solid state, expressed in percentage of the weight of the fat, at that temperature.

Another aspect of the present invention concerns a process for preparing an edible plastified dispersion, comprising:

(a) mixing oil and water so as to obtain an oil- and water-containing emulsion, comprising from 15-28 wt. % fat, from 85-72 wt. % water and less than 0.1 wt. % of amino acid residues;

(b) cooling at least part of the oil, the water or the mixture of oil and water; and (c) working the oil- and water-containing emulsion under such conditions that an oil-continuous phase is formed, and the number weighted mean diameter of the dispersed aqueous phase droplets is less than 5 μm.

The process may be carried out by any conventional means. Preferably, however, the present process is carried out by passing the oil and/or water through apparatus known as Votators (A-units), Crystallizers (C-units), Cavity transfer mixers, static mixers and/or resting tubes (B-units).

EXAMPLE 1

A series of edible, plastified dispersions was prepared, each dispersion containing 19.7 wt. % fat and comprising 20 wt. % continuous fat phase and 80 wt. % dispersed aqueous phase. The fat composition was varied. For each sample the following composition was used:

| Fat phase | | |
|---|---|---|
| Fat | 19.7 wt. % | |
| Hymono 4404* | 0.3 wt. % | |
| | | 20 wt. % |
| Aqueous phase | | |
| Tap water | 78.4 wt. % | |
| Salt | 1.44 wt. % | |
| K-sorbate | 0.16 wt. % | |
| Lactic acid to pH 4.8 | 0.016 wt. % | |
| | | 80 wt. % |

*Hymono 4404 ® is an emulsifier composition mainly consisting of monoglycerides derived from sunflower oil and hydrogenated to an iodine value of 40. The slip melting point of the composition is 47° C.

The fat employed consisted of a blend of sunflower oil with one of the following two fat compositions:

Composition (A) consisting of a randomly interesterified blend of a 1:1 (wt) mixture of palm oil hydrogenated to a slip melting point of 58° C. and palmkernel oil hydrogenated to a slip melting point of 39° C., and Composition (B) consisting of 60 parts by weight of soybean oil hydrogenated to a slip melting point of 38° C. and 40 parts by weight of a randomly interesterified mixture of 40 parts by weight of palm oil and 60 parts by weight of palmkernel oil.

The fat compositions used in the experiments are shown in Table I below.

TABLE 1

| Sample | Composition A (wt. %) | Composition B (wt. %) | Sunflower oil (wt. %) |
|---|---|---|---|
| 1a | 20 | — | 80 |
| 1b | 17 | — | 83 |
| 1c | 14 | — | 86 |
| 1d | — | 54 | 46 |
| 1e | — | 44 | 56 |
| 1f | — | 34 | 66 |

The samples were prepared on a laboratory scale by continuously feeding 1 part by weight of fat phase composition and 4 parts by weight of aqueous phase composition, each composition having been heated to 60° C., through a series of 2 stirred crystallizers (C-units) provided with a cooling jacket, cooled with tap water. The C-units were operated at a shaft speed of 1400 rpm. The jacket temperatures of the first and second C-unit were 5° and 7° C., respectively. The samples left the first C-unit having a temperature between 12° and 20° C., depending on the fat composition of the sample. The plastified dispersion emerging from the second C-unit had a temperature between 11° and 16° C. The samples were filled into tubs and stored for 1 week. The evaluation results are shown in Tables 2 and 3 below.

TABLE 2

| Sample | N5+ | N20+ | N30+ | D(0,0)* (μm) |
|---|---|---|---|---|
| 1a | 20 | 11 | 6 | 0.5 |
| 1b | 16 | 9 | 4 | 0.7 |
| 1c | 14 | 7 | 3 | 0.9 |
| 1d | 34 | 11 | 3 | 1.7 |
| 1e | 27 | 8 | 2 | 1.1 |

TABLE 2-continued

| Sample | N5+ | N20+ | N30+ | D(0,0)* (μm) |
|---|---|---|---|---|
| 1f | 20 | 6 | 1 | 0.9 |

*D(0,0) indicates the number weighted mean diameter (in μm) of the aqueous phase droplets determined via NMR.
+N5, N20 and N30 indicate the wt. % of the fat that is in the solid state, measured by means of NMR, at 5, 20 and 30° C., respectively.

In Table 3 the C-value at 5°, 10°, 15° and 20° C., the T50-value and the conductivity at 15° C. are given.

The C-values indicate the hardness, which is measured via a cone penetrometer, at the indicated temperature. The C-values are a measure for the spreadability.

The T50-value indicates the temperature at which half of the emulsion is broken down, as determined by measuring the release of salt at gradually increasing temperatures via the conductivity. Products having a T-50 value substantially above body temperature do not break down easily in the mouth.

The conductivity is measured in μs/cm. S indicates Siemens. At low conductivity values, e.g. below about 0.1, the risk of microbiological deterioration occurring is small.

TABLE 3

| Sample | C5 | C10 | C15 | C20 | T50 (°C.) | Conductivity at 15° C. (μS/cm) |
|---|---|---|---|---|---|---|
| | (g/cm²) | | | | | |
| 1a | 268 | 180 | 144 | 180 | 42 | 0.001 |
| 1b | 200 | 162 | 131 | 142 | 40 | 0.001 |
| 1c | 137 | 123 | 129 | 132 | 39 | 0.0001 |
| 1d | 357 | 223 | 138 | 131 | 38 | 0.00001 |
| 1e | 227 | 134 | 141 | 93 | 35 | 0.0001 |
| 1f | 196 | 122 | 111 | 90 | 33 | 0.001 |

The organoleptic properties were evaluated by a trained team. Samples 1c–1f had good in-mouth properties. The flavour release of sample 1b and in particular of sample 1a were less favourable, in agreement with their higher T50-values, but not unacceptable.

The samples were stored for another 5 weeks. After 6 weeks' storage, sample 1a turned out to be slightly unstable. The other 5 samples seemed to have remained unchanged during storage.

EXAMPLE 2

The preparation of sample 1e of Example 1 was repeated, except that the jacket temperature of the C-units was 9° C. The exit temperature of the product was 16° C. A suitable product was obtained. This preparation was repeated five times while successively including one of the following ingredients in the aqueous phase composition:
 (i) 0.5 wt. % Paselli SA2 ® (Hydrolyzed potato starch with DE =2) providing a protein content in the aqueous phase of 0.0015 wt. %
 (ii) 0.00015 wt. % sodium caseinate
 (iii) 0.00025 wt. % sodium caseinate
 (iv) 0.00030 wt. % sodium caseinate
 (v) 0.00015 wt. % gelatin All five products comprised an aqueous phase having a very low viscosity. Products (1), (ii) and (v) were stable and had a reasonable quality. Product (iii) appeared to lose water on spreading, whereas product (iv) lost water during the preparation thereof.

EXAMPLE 3

A series of experiments was carried out as described in Example 1, but using emulsifiers of various kinds and quantities. The fat compositions used were the same as those in samples 1b and 1e. The amount of fat employed was adjusted to the emulsifier content such that the total amount of fat and emulsifier was 20 wt. % of the dispersion in each of the samples. The compositions employed are shown in Table 4.

TABLE 4

| Sample | Emulsifier (wt. %) | Fat composition (as in sample:) |
|---|---|---|
| 3a | 0.30 wt. % Hymono 4404 (IV = 40) | 1e |
| 3b | 0.38 wt. % Hymono 4404 (IV = 40) | 1e |
| 3c | 0.46 wt. % Hymono 4404 (IV = 40) | 1e |
| 3d | 0.55 wt. % Hymono 4404 (IV = 40) | 1e |
| 3e | 0.80 wt. % Hymono 4404 (IV = 40) | 1e |
| 3f | 1.00 wt. % Hymono 4404 (IV = 40) | 1e |
| 3g | 0.55 wt. % Hymono 7804 (IV = 100)* | 1e |
| 3h | 0.80 wt. % Hymono 7804 (IV = 100)* | 1e |
| 3i | 1.00 wt. % Hymono 7804 (IV = 100)* | 1e |
| 3j | 0.55 wt. % Hymono 7804 (IV = 100)* | 1b |
| 3k | 0.80 wt. % Hymono 7804 (IV = 100)* | 1b |
| 3l | 1.00 wt. % Hymono 7804 (IV = 100)* | 1b |
| 3m | 0.55 wt. % Hymono 8903 (IV = 3)* | 1e |
| 3n | 0.80 wt. % Hymono 8903 (IV = 3)* | 1e |
| 3o | 1.00 wt. % Hymono 8903 (IV = 3)* | 1e |

*These emulsifiers are similar to Hymono 4404 but hydrogenated to the indicated iodine value. The slip melting points of Hymono 7804 and 8903 are 40° C. and 65° C., respectively.

The samples were evaluated after 2 weeks' storage and compared with Weightwatchers ®, a low fat spread containing 40 wt. % fat. A trained panel determined a "waxiness score", a higher score indicating that the emulsion breaks down less readily in the mouth. The results are shown in Table 5.

TABLE 5

| Sample | C5 (g/cm²) | C15 | Conductivity 15° C. (μS/cm) | T50 (°C.) | D(0,0) (μm) | Waxiness |
|---|---|---|---|---|---|---|
| 3a | 204 | 136 | 0.001 | 37 | 1.6 | 6.6 |
| 3b | 189 | 117 | 0.001 | 37 | 0.9 | — |
| 3c | 189 | 173 | 0.001 | 38 | 3.0 | 7.2 |
| 3d | 194 | 123 | 0.0001 | 38 | 3.1 | 7.2 |
| 3e | 201 | 113 | 0.001 | 50 | 4.3 | 7.6 |
| 3f | 172 | 109 | 0.001 | 47 | 4.7 | 7.7 |
| 3g | 162 | 117 | 0.0001 | 39 | 3.9 | 7.3 |
| 3h | 152 | 103 | 0.001 | 47 | 3.0 | 7.7 |
| 3i | 150 | 92 | 0.001 | 48 | 5.1 | 7.6 |
| 3j | 164 | 149 | 0.0001 | 44 | 3.6 | 7.9 |
| 3k | 166 | 153 | 0.0001 | 44 | 4.3 | 7.8 |
| 3l | 179 | 172 | 0.001 | 48 | 4.8 | 8.1 |
| 3m–3o* | — | — | — | — | — | — |
| ref. | — | — | — | 38 | — | 7.3 |

*With emulsifier Hymono 8903 no stable products could be prepared with the process employed.

These experiments show that especially the samples with relatively low emulsifier contents have organoleptic properties, as indicated by the waxiness score and the T50, at least as good or even better than the reference product, although it contains only half the amount of fat.

EXAMPLE 4

A series of products was prepared similarly as described in Example 1, using a different emulsifier for each run. In all cases the fat blend employed was the same as in sample 1e. Emulsifier composition was included such that the product would contain 0.55 wt. % emulsifier. For the preparation of each product, initially only fat phase composition was fed through the cooled, stirred crystallizers. Then gradually increasing amount of aqueous phase composition was admixed with fat phase composition. The preparation was stopped when either the resulting product was no longer a proper plastified dispersion with a continuous fat phase or a fat content of the resulting product of 20 wt. % had been reached. In Table 6, the fat content of the product at the end of each run is shown.

TABLE 6

| Emulsifier type | Trade-name | Iodine value | wt. % fat |
|---|---|---|---|
| Monoglycerides | Hymono 7804 | 100 | 20 |
| | Hymono 4404 | 40 | 20 |
| | Hymono 8903 | 3 | >40 |
| Acetic acid esters of monoglycerides | Cetodan 50-00 | 2 | 24 |
| | Cetodan 70-00 | 2 | 26 |
| | Cetodan 90-40 | ~35 | >40 |
| Polyglycerol esters of fatty acids | Admul PGE 1411 | 45 | 24 |
| | Drewpol 3-1-SHK | 45 | 30 |
| | Drewpol 10-10-0 | 90 | 20 |
| | Triodan 20 | ~80 | 26 |

EXAMPLE 5

An edible, plastified dispersion was prepared using the following fat phase composition:

| | wt. % |
|---|---|
| Soybean oil | 81.5 |
| Interesterified blend of a fully hydrogenated, 1:1 mixture of a lower melting fraction of palm-kernel oil and palm oil | 17.0 |
| Hymono 4404 ® | 1.5 |

The N-values of the fat phase composition, determined with NMR as indicated above, at 5°, 20° and 30° C. were 30.6, 15.5 and 6.9, respectively.

As aqueous phase the following composition was used:

| | wt. % |
|---|---|
| Salt | 1.8 |
| K-sorbate | 0.2 |
| Lactic acid | 0.02 |
| Water | 98 |

The aqueous phase composition was pasteurized by heating to 90° C. and then the composition was cooled immediately to 60° C. The fat phase composition was heated to 60° C.

The spread was prepared on laboratory scale by continuously feeding 4 parts by weight of aqueous phase with 1 part by weight of fat phase into an agitated crystallizer provided with a cooling jacket, cooled with tap water. The shaft speed was about 5500 rpm. The water-in-oil emulsion left the crystallizer having a temperature of about 28° C. The emulsion was subsequently passed through another cooled, agitated crystallizer (Votator ®C-unit) operated with a shaft speed of 1400 rpm. The plastified dispersion left this crystallizer having a temperature of 23° C. and was filled into tubs. The product was stored for 2 weeks at 5° C.

The product had a volume weighted mean diameter of 4 μm and a conductivity of 0.01 μS/cm.

For comparison, the experiment was repeated using an aqueous phase composition that contained 11 wt. % Paselli SA2 maltodextrin, thus causing the aqueous phase to contain 0.03 wt. % protein. A product having a continuous fat phase was obtained. However, the resulting product had a conductivity of 12 μS/cm, which indicates that it is likely to suffer from microbiological degradation, and there was a severe loss of water when it was spread. The number weighted mean diameter of the aqueous phase droplets was 9.5 μm.

EXAMPLE 6

A series of products corresponding to samples 3a, 3d and 3f, but otherwise containing a conventional amount of a flavour cocktail, were prepared as described in Example 1 but on a pilot plant scale. The products were consumer tested, using Weightwatchers ® 40% fat spread as reference product.

The waxiness scores, determined by an expert panel, for the products according to the invention were 6.3, 6.9 and 7.6 in the order of increasing emulsifier content, the differences being significant. The waxiness score of the reference 40% fat product was 6.7. However, when evaluated by consumers, there was no significant difference in overall liking between any of the four products.

We claim:

1. An edible plastified dispersion containing less than 35 wt. % fat, which comprises from 10-35 wt. % continuous fat phase and from 90-65 wt. % dispersed aqueous phase, said dispersed aqueous phase having an average droplet size, indicated by the number weighted mean diameter, of less than 2.5 um, which dispersion comprises less than 2.5 ppm amino acid residues and wherein at least 20 wt. % of the aqueous phase droplets have a diameter of less than 4 microns, said dispersion releasing its flavor in the mouth.

2. The edible plastified dispersion of claim 1 wherein the dispersion comprises from 1 ppm amino acid residues up to 2.5 ppm amino acid residues.

3. Dispersion according to claim 1, of which the number weighted mean diameter of the aqueous phase droplets is between 0.1 and 4.8 μm.

4. Dispersion according to claim 1, wherein the aqueous phase has a viscosity of less than 5 cps at a temperature of 35° C. and a shear rate of $1000 \text{ s}^{-1}$.

5. Dispersion according to claim 1, containing less than 6 wt. % solid fat at 30° C., calculated on the weight of the fat.

6. Dispersion according to claim 1, comprising from 15-28 wt. % continuous fat phase and from 85-72 wt. % dispersed aqueous phase.

7. Dispersion according to claim 1, wherein the aqueous phase contains 95-99.5 wt. % water.

8. The dispersion according to claim 1 further comprising an emulsifier, the content of said emulsifier being less than 2 wt% and wherein multiplication of the emulsifier content in weight % by the number weighted mean diameter of the aqueous phase droplets in microns yields a value of less than 2.5.

9. The dispersion according to claim 1 further comprising an emulsifier, the content of said emulsifier being less than 0.5 wt%.

10. The dispersion according to claim 1 comprising less than 2.0 wt% of a component selected from the group consisting of gelling agents, thickening agents and mixtures thereof.

11. A process for preparing an edible plastified dispersion comprising (a) mixing oil and water so as to obtain an oil-and-water containing emulsion comprising from 15-28 wt. % fat, from 85-72 wt. % water and less than 2.5 ppm of amino acid residues; (b) cooling at least part of a component selected from the group consisting of the oil, the water and the mixture of oil and water; and (c) working the oil-and-water-containing emulsion under such conditions that an oil continuous phase is formed, and the number weighted mean diameter of the dispersed aqueous phase droplets is less than 2.5 μm, said dispersion releasing its flavor in the mouth.

12. The process according to claim 11 wherein the oil-and-water-containing emulsion comprises from 1 ppm amino acid residues up to 2.5 ppm amino acid residues.

* * * * *